US008996725B2

(12) United States Patent
Haywood et al.

(10) Patent No.: US 8,996,725 B2
(45) Date of Patent: Mar. 31, 2015

(54) PROGRAMMATIC REDIRECT MANAGEMENT

(75) Inventors: Shawn L. Haywood, Markham (CA); Karson Ng, Maple (CA); Walfrey Ng, Markham (CA)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 13/365,299

(22) Filed: Feb. 3, 2012

(65) Prior Publication Data
US 2013/0124755 A1 May 16, 2013

(30) Foreign Application Priority Data

Nov. 14, 2011 (CA) ........................ 2757816

(51) Int. Cl.
*G06F 15/173* (2006.01)
*G06F 17/30* (2006.01)
(52) U.S. Cl.
CPC ........ *G06F 15/173* (2013.01); *G06F 17/30887* (2013.01)
USPC ......................................... 709/238; 709/223
(58) Field of Classification Search
CPC ............................ H04L 45/22; H04L 67/2814
USPC ................................................ 709/223, 238
See application file for complete search history.

(56) References Cited

U.S. PATENT DOCUMENTS

| | | | |
|---|---|---|---|
| 6,981,210 B2 | 12/2005 | Peters et al. | |
| 7,861,001 B2 * | 12/2010 | Allen et al. | 709/238 |
| 7,930,400 B1 | 4/2011 | Fox et al. | |
| 7,958,258 B2 * | 6/2011 | Yeung et al. | 709/238 |
| 7,970,874 B2 * | 6/2011 | Kale et al. | 709/221 |
| 2004/0059797 A1 * | 3/2004 | Velan et al. | 709/219 |
| 2006/0020684 A1 * | 1/2006 | Mukherjee et al. | 709/219 |
| 2006/0041635 A1 * | 2/2006 | Alexander et al. | 709/218 |
| 2006/0070022 A1 | 3/2006 | Ng et al. | |

(Continued)

FOREIGN PATENT DOCUMENTS

KR   20030000692   1/2003

OTHER PUBLICATIONS

English Abstract of KR 20030000692(A); published Jan. 6, 2003; http://worldwide.espacenet.com/publicationDetails/biblio?CC=KR&NR=20 . . . ; Abstract downloaded Dec. 2, 2011; 1 page.

(Continued)

*Primary Examiner* — Phuoc Nguyen
(74) *Attorney, Agent, or Firm* — Cantor Colburn LLP; Ingrid Foerster (57) ABSTRACT

A computer-implemented process for programmatic redirect management receives a request containing a uniform resource locator, identifies a set of keyword tokens in the uniform resource locator of the request and a set of associated token identifications and determines whether a token identification in the set of associated token identifications is located in a data structure of a redirect registry. Responsive to a determination that the token identification in the set of associated token identifications is located in the redirect registry, the computer-implemented process performs token identification mapping for each token identification in the set of associated token identifications, updating statistics for each token identification mapped in the set of associated token identifications and responsive to a determination that token identification mapping is complete, composes a redirect uniform resource locator.

17 Claims, 7 Drawing Sheets (56) References Cited

U.S. PATENT DOCUMENTS

| | | | |
|---|---|---|---|
| 2007/0061334 A1* | 3/2007 | Ramer et al. | 707/10 |
| 2008/0091843 A1 | 4/2008 | Kulkarni | |
| 2008/0172404 A1 | 7/2008 | Cohen | |
| 2009/0228438 A1* | 9/2009 | Dasgupta et al. | 707/3 |
| 2009/0254425 A1 | 10/2009 | Horowitz et al. | |
| 2009/0271497 A1 | 10/2009 | Roberts | |
| 2010/0036955 A1 | 2/2010 | Hopen et al. | |

OTHER PUBLICATIONS

Paper by INTERSPIRE; entitled Moving installed shopping cart up one level on sever—p. 2—Interspire F . . . 4 pages; downloaded Dec. 2, 2011; https://www.interspire.com/forum/showthread.php?p=73601; 4 pages.

Web Page—Stack Overflow "301 redirect with PHP and MySQL on 404", http://stackoverflow.com/questions/748135/301-redirect-with-php-and-mysql-on-404, downloaded Apr. 4, 2012.

Web Page—Squidoo "A 301 Redirect Guide for the Clueless!", http://www.squidoo.com/301, downloaded Apr. 4, 2012; pp. 1-6.

Web Page—askapache.com "SEO Redirects without mod_rewrite", http://www.askapache.com/htaccess/seo-search-engine-friendly-redirects-without-mod_rew . . . , downloaded Apr. 4, 2012, pp. 1-5.

Web Page—drupal.org "Global Redirect", http://drupa.org/project/globalredirect, downloaded Apr. 4, 2012; pp. 1-2.

Web Page—Stack Overflow "Link parser with "Ghosted" 301 redirect", http://stackoverflow.com/questions/5362037/Ink-parser-with-ghosted-301-redirect, downloaded Apr. 4, 2012, pp. 1-2.

Web Page The Search Engine Optimizer.com—Search Engine Positioning "Search Engine Optimization Specialist—Become Your Own" http://www.the-search-engine-optimizer.com; downloaded Apr. 4, 2012, pp. 1-11.

Web Page—SEO-Muscle.com "SEO Muscle—Search Engine Marketing", htp://www.seo-muscle.com/301-redirects-url-rewriting/; downloaded Apr. 4, 2012, pp. 1-4.

Web Page—Tech-FAQ "How to Create a 301 Redirect", http://www.tech-faq.com/how-to-create-a-301-redirect.html, downloaded Apr. 4, 2012, pp. 1-4.

\* cited by examiner

Redirect engine 300

PROGRAMMATIC REDIRECT MANAGEMENT

CROSS-REFERENCE TO RELATED APPLICATIONS

This application claims priority to Canadian Patent Application No.: CA2757816, filed 14 Nov. 2011, and all the benefits accruing therefrom under 35 U.S.C. §119, the contents of which in its entirety are herein incorporated by reference.

BACKGROUND

This disclosure relates generally to locating resources in a network in a data processing system and more specifically to programmatic redirect management for locating resources in a network in the data processing system.

When a web page of a website has an universal resource locator (URL) address changed, the website could lose valuable page ranking with search engines and affiliate links for the webpage. The loss may occur because the search engines and affiliates are pointing to the old URL address, which is now an invalid URL address. As a result, a typical search engine optimization solution handles changes to page URLs by returning what is referred to as a "301 redirect" to a new page, rather than showing a default "404 page not found" exception that would otherwise be presented to a site visitor.

An existing approach for a "301 redirect" situation is usually managed at a web server level, for example, using a configuration file, such as .htaccess, providing a mapping of old URLs to corresponding replacement URLs. A typical drawback of the existing approach is that it incurs manual overhead and is error prone. For example, when a URL address of a web page is changed, a technical person must manually update the web server configuration file to create a redirect rule for the changed page. An entire URL is typically mapped to a corresponding entire URL. In another example, a concept of a linked keyword may be used to represent a mapping of one element to a set of elements of an URL to provide a one-to-many mapping of elements. Accordingly, this leads to additional overhead and potential for mistakes since business users may change URLs and not inform technical administrators unintentionally leading to a "404 page not found" exception.

In another example, a large number of mappings are required for an online retail site with thousands or millions of products. When using traditional redirects having a hierarchical URL structure (containing many URL tokens), such as Furniture/Chairs/LoungeChairs, a change made to one of the parent tokens in the hierarchy, such as "Furniture", requires technical administrators to create more elaborate redirect rules or multiple rules to remap all the child tokens to respective new locations from within the configuration file of the web server. When the same URL address needs to be changed several times, while keeping all previous rules still active, the problem is compounded. In the example, changing Furniture can potentially impact URLs of hundreds of associated products. A URL token is a keyword representing a portion of or a complete URL of a web page in a site. Each of the tokens is separated from another token in the URL by separator characters (for example, a slash in the examples).

Yet another potential issue with the common approach to 301 redirects is that a mapping solution is typically web server specific. A web server specific implementation requires a different solution for each web server, thus increasing maintenance and a potential for error.

Using existing approaches typically requires storing URL-to-URL mappings, which map the original URLs to redirected URLs. Creating and managing the URL-to-URL mappings requires prior knowledge of URL structures to create the pre-formed URL mapping rules. As the structure of any of original URLs change, there is a high maintenance cost associated with updating these mappings.

Using the online store with the existing approaches as an example, when a change is made from the "Furniture" category to a "SpringFurniture" category then a mapping is required such as:
//Mapping Rule 1
From: http://www.yourstore.com/Furniture/ . . .
To: http://www.yourstore.com/SpringFurniture/ . . .

Also, when multiple URL structures containing the same URL keyword (Furniture in this example) are present then mappings for each of these structures is needed, as in:
//Mapping Rule 1 From: http://www.yourstore.com/Furniture/ . . .
To: http://www.yourstore.com/SpringFurniture/ . . .
//Mapping Rule 2 From: http://www.yourstore.com/Sales/Furniture/ . . .
To: http://www.yourstore.com/Sales/SpringFurniture/ . . .
//Mapping Rule 3 From: http://www.yourstore.com/Sales/Outlet/Furniture/ . . .
To: http://www.yourstore.com/Sales/Outlet/SpringFurniture/ . . .

Further, when "Sales" is updated to become "Discounts" the complexity of the mappings continually increases with the number of updated structures. While the example is a simple illustration, with each additional change to a URL the system needed to maintain the redirect relationships becomes more complex very quickly.

SUMMARY

According to one embodiment, a computer-implemented process for programmatic redirect management receives a request containing a URL, identifies a set of keyword tokens in the URL of the request and a set of associated token IDs and determines whether a token ID in the set of associated token IDs is located in a data structure of a redirect registry. Responsive to a determination that the token ID in the set of associated token IDs is located in the redirect registry, the computer-implemented process performs token ID mapping for each token ID in the set of associated token IDs, updating statistics for each token ID mapped in the set of associated token IDs and responsive to a determination that token ID mapping is complete, composes a redirect URL.

According to another embodiment, a computer program product for programmatic redirect management, the computer program product including a computer readable storage medium having computer readable program code embedded therewith. The computer readable program code including computer readable program code configured for performing a method. The method including receiving a request containing a uniform resource locator, identifying a set of keyword tokens in the uniform resource locator of the request and a set of associated token identifications and determining whether a token identification in the set of associated token identifications is located in a data structure of a redirect registry. The method also includes performing token identification mapping for each token identification in the set of associated token identifications responsive to a determination that the token identification in the set of associated token identifications is located in the redirect registry. The method also includes updating statistics for each token identification mapped in the set of associated token identifications and determining whether token identification mapping is complete. The method further includes composing a redirect uniform resource locator responsive to a determination that token identification mapping is complete.

According to another embodiment, a system for programmatic redirect management, the system includes a processor unit configured to perform a method. The method includes receiving a request containing a uniform resource locator, identifying a set of keyword tokens in the uniform resource locator of the request and a set of associated token identifications and determining whether a token identification in the set of associated token identifications is located in a data structure of a redirect registry. The method also includes performing token identification mapping for each token identification in the set of associated token identifications responsive to a determination that the token identification in the set of associated token identifications is located in the redirect registry. The method further includes updating statistics for each token identification mapped in the set of associated token identifications and determining whether token identification mapping is complete. The method also includes composing a redirect uniform resource locator responsive to a determination that token identification mapping is complete.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
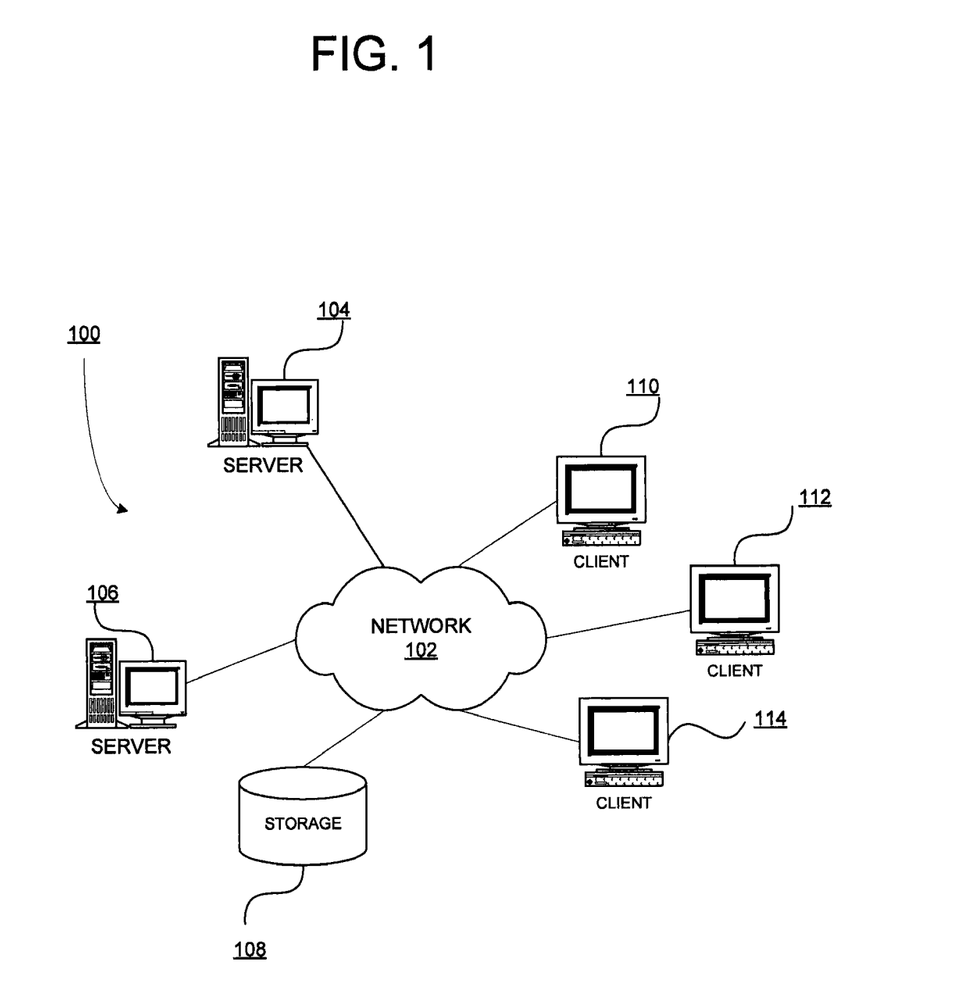
FIG. 1 is a block diagram of an exemplary network data processing system operable for various embodiments of the disclosure.
Figure 2:
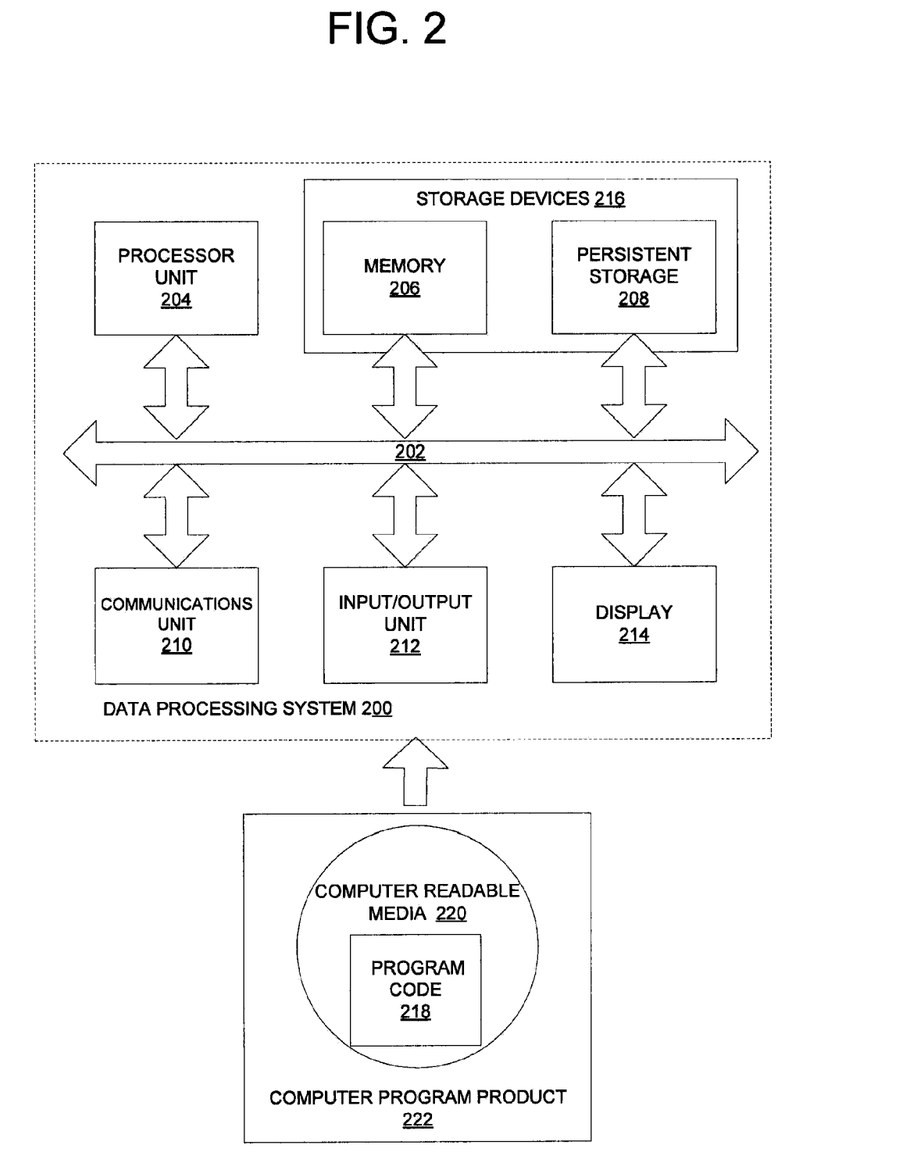
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for programmatic redirect management is presented. The computer-implemented process receives an input URL that is analyzed to identify inactive URL keyword tokens. The inactive URL keyword tokens are replaced with the appropriate redirect tokens to carry out the URL request.

Processor unit 204 receives a request containing a URL using communications unit 210, input/output unit 212, display 214 or storage devices 216, and identifies a set of keyword tokens in the URL of the request and a set of associated token IDs. The processor unit 204 then determines whether a token ID in the set of associated token IDs is located in a data structure of a redirect registry, maintained in storage devices 216 of the data processing or another system such as that including network data processing 100 of FIG. 1. Responsive to a determination that the token ID in the set of associated token IDs is located in the redirect registry, processor unit 204 performs token ID mapping for each token ID in the set of associated token IDs, updating statistics for each token ID mapped in the set of associated token IDs and responsive to a determination that token ID mapping is complete, composes a redirect URL.

Embodiments of the disclosed process typically enable "301 redirects" to be generated programmatically within an application layer upon a change of a URL address by a business user. Using a framework in an embodiment of the disclosed process provides a capability to automatically generate and store the redirect rules in a data structure, such as a database, rather than require a technical administrator to manually edit a web server configuration file as typically performed in previous solutions. An embodiment of the disclosed process is web server independent, thus providing flexibility to typically be implemented on any platform or configuration.

The number of URL keyword tokens changed, or the number of changes made to a URL keyword token, is typically not an issue because embodiments of the disclosed process generate token to token mapping rules rather than creating an exhaustive list of rules for all possible URL address combinations, keeping a footprint of a supporting data structure small. Using a prior approach, for example, typically required when a token of "Furniture" in a hierarchical URL structure of Furniture/Chairs/LoungeChairs was changed, lead to creation of hundreds of mappings for all the products under the "Furniture." In another example of a prior approach fewer mappings were created but the mappings were more complex. However, using a framework in an embodiment of the disclosed process in the above example only a single mapping is needed between "Furniture" and a respective replacement token, which significantly reduces the number of mappings needed and accordingly typically improves performance.

Figure 3:
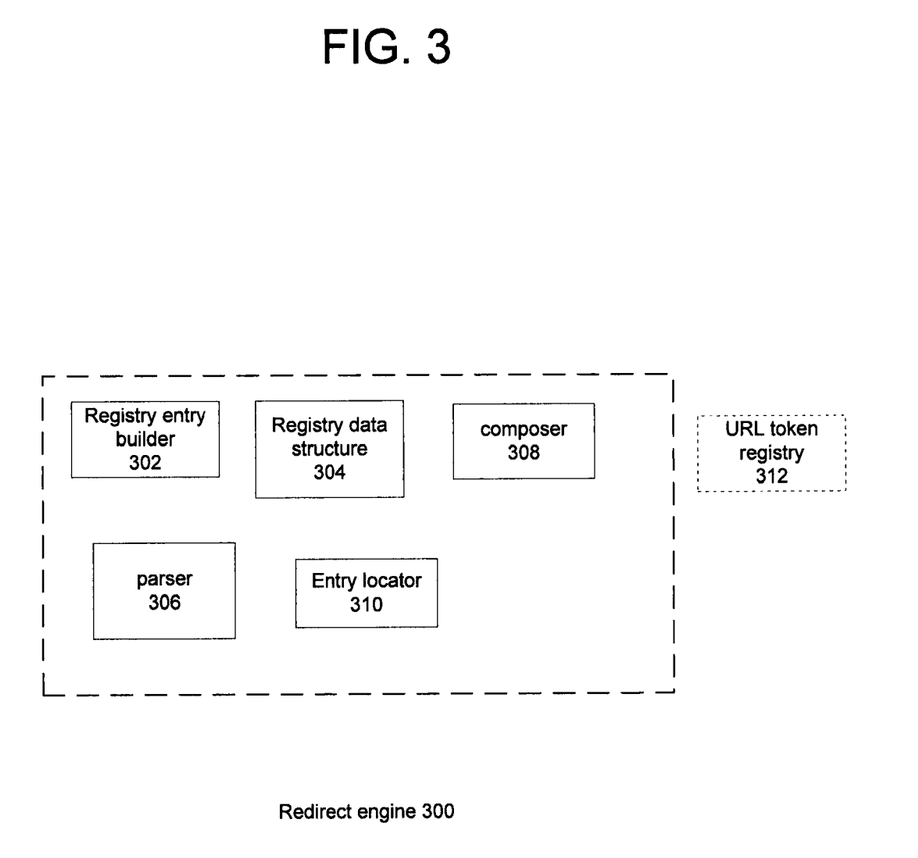
FIG. 3 is a block diagram a redirect engine in accordance with one embodiment of the disclosure.

With reference to FIG. 3, a redirect engine in accordance with one embodiment of the disclosure is presented. Redirect engine 300 is an example of a redirect processing system which may be implemented on and leverage support of a data processing such as network data processing 100 of FIG. 1 or data processing system 200 of FIG. 2 in accordance with the disclosure.

Redirect engine 300 includes a number of components including registry builder 302, registry data structure 304, parser 306, composer 308 and entry locator 310 to provide a capability of programmatic redirect management. Redirect engine 300 as shown with representative functional elements, may be implemented as a combination of discrete functional elements or a monolithic set of logic without limitation to the capability provided. URL token registry 312 is not part of redirect engine 300 but is used by redirect engine 300 as a service and is described more fully in reference to FIG. 4.

Registry builder 302 provides a capability to receive change information associated with URL elements, which have been tokenized and generates entries in registry data structure 304. Tokenization is a known existing process performed where a URL is separated into a set of respective URL elements. Each of the identified URL elements is assigned a unique token ID corresponding to an associated keyword. Tokenization of URLs is performed to provide input to redirect engine 300, however registry builder 302 only uses a token ID portion of the information maintained by URL token registry 312.

Each entry of registry data structure 304 provides a mapping between an original URL token and a corresponding replacement token. A sequence of mappings may be traversed to create a final mapping from an original URL token and a final replacement token. Each token ID in registry data structure 304 is associated with statistics including a "last used" timestamp and a "use count" value representative of the number of times a token ID has been referenced. Statistics are used to manage the relevance of entries maintained in registry data structure 304. For example, a use count may be used to determine whether to migrate an entry into or out of cache of registry entries.

Parser 306 provides a capability to receive an original URL and identify a pattern associated with the original URL to identify individual elements in the form of keywords to identify a set of keywords, each of which is associated with a corresponding unique token ID. A parsed URL provides a set of token IDs, resulting from a lookup in URL token registry 312, which is representative of the URL provided. Each token in the set of token IDs is used by entry locator 310 to determine whether an exact match is found within registry data structure 304. When a match is found, a corresponding token ID of a respective pair of token IDs including the entry is used, unless in a subsequent search within registry data structure 304 another mapping is found using the previously mapped token ID until all mapping is complete.

Composer 308 provides a capability to resolve a resultant string of token IDs into a redirect URL that is processed as in the original request.

Figure 4:
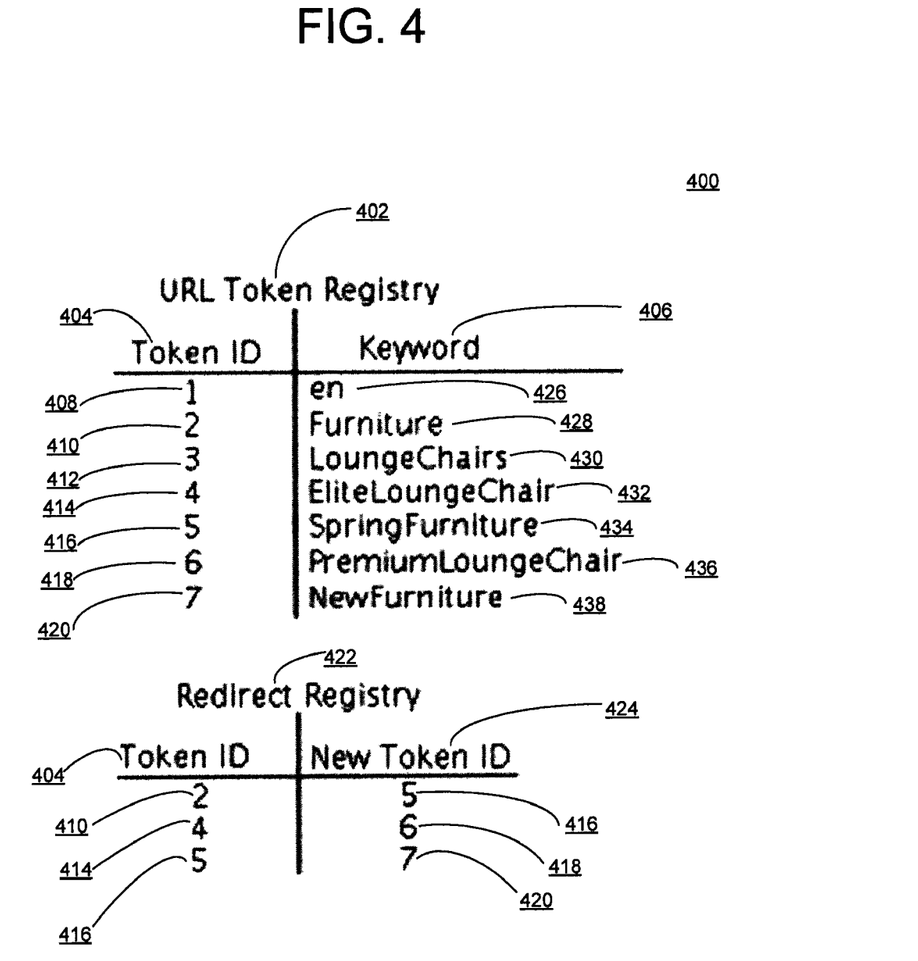
FIG. 4 is a block diagram of redirect registry portion of the redirect engine of FIG. 3 in accordance with one embodiment of the disclosure.

With reference to FIG. 4, it is a block diagram of logical view of a redirect registry portion of the redirect engine of FIG. 3 in accordance with one embodiment of the disclosure. Redirect registry 422 is an example of a redirect registry in accordance with the disclosure.

Logical view 400 includes a portion containing URL token registry 402 and a portion containing redirect registry 422. URL token registry 402 is not part of redirect engine 300 of FIG. 3 but supports processing using redirect engine 300 of FIG. 3 in conjunction with redirect registry 422.

In the example provided, the data structure representative of URL token registry 402 may be viewed as a table of entries. Columns of the table in this instance represent token IDs and associated keywords as in Token ID 404 and Keyword 406 respectively. Each row in the table is then a pairing of token ID with a respective keyword. The token IDs are illustrated as a set of token IDs 408, 410, 412, 414, 416, 418 and 420 representing unique token IDs 1, 2, 3, 4, 5, 6 and 7 respectively. The token keywords are illustrated as a set of keywords 426, 428, 430, 432, 434, 436 and 438 representing keywords of "en", "Furniture," "LoungeChairs," "EliteLoungeChair," "SprinFurniture," "PremiumLoungeChair" and "NewFurniture" respectively. URL token registry 402 is previously constructed by parsing URLs defined for use with a web based application using a known technique (outside the scope of this disclosure).

Redirect registry 422 may be viewed as data structure in a similar manner to a construct of URL token registry 402. Redirect registry 422 is, however, designed to be more lightweight than URL token registry 402 because redirect registry 422 contains only change data reflecting changes from old URL keywords to new URL keywords. For example, the column of Token ID 404 of redirect registry 422 typically contains a relatively small but active subset of token IDs from URL token registry 402 representing inactive token portions of URLs previously described in URL token registry 402. New token ID 424 represents token IDs replacing the corresponding entry in Token ID 404 of redirect registry 422.

For example token IDs 410, 414 and 416 of redirect registry 422 are replaced by corresponding new token IDs of 416, 418 and 432 respectively using redirect registry 422. From the example, using redirect registry 422 token ID 410 (value of 2) is mapped to new token ID 416 (value of 5), which is later mapped to new token ID 420 (value of 7).

Figure 5:
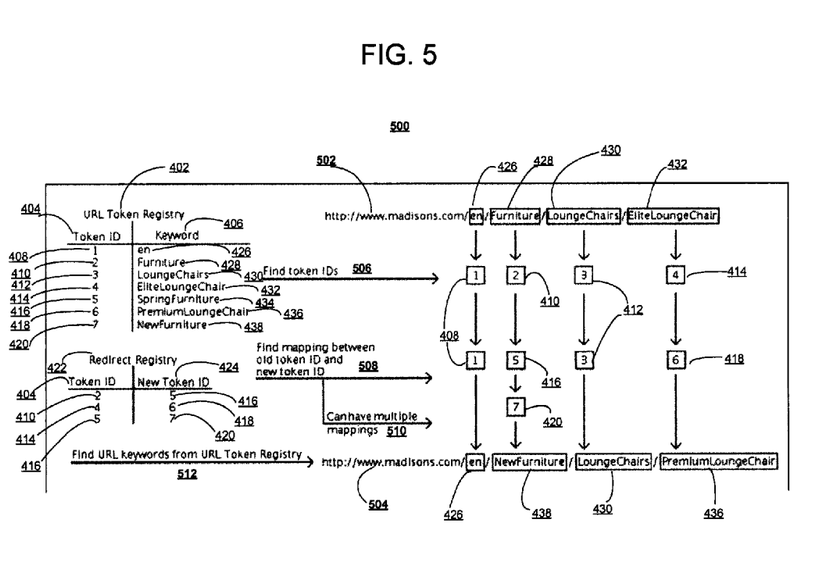
FIG. 5 is a schematic diagram of a logical view of a redirect management process using the redirect engine of FIG. 3 in accordance with one embodiment of the disclosure.

With reference to FIG. 5 a schematic diagram of a logical view of a redirect management process using the redirect engine of FIG. 3 in accordance with one embodiment of the disclosure is presented. Process 500 is an example using URL token registry 402 and redirect registry 422 both of FIG. 4 (shown here for completeness) to transform input URL 502 into redirect URL 504 of redirect engine 300 of FIG. 3.

Find token IDs 506, a sub-process, using keyword elements of keywords 426, 428, 430 and 432 of FIG. 4 found in parsing input URL 502, performs a lookup of URL token registry 402 of FIG. 4. Having found keywords in the set of keywords, token IDs 408, 410, 412 and 414 associated with the respective keywords are obtained.

Find mapping between the old token ID and the new token ID 508 is a sub-process, which locates corresponding entries in redirect registry 422 of FIG. 4 given an old token ID. For example token ID 408 is an identify mapping because there is no entry for redirect (similar to token ID 412 mapping). In contrast, token ID 410 maps initially to token ID 416 and subsequently to token ID 420 represented in can have multiple mappings 510 which is an iterative sub-process to resolve a sequence of mappings using a related set of correspondence pairings in which success mappings are required to arrive at a final new token ID. A typical single step mapping is represented in the mapping of token ID 414 to token ID 418.

Find URL keywords from URL token registry 512 is a sub-process that performs a lookup in URL token registry 402 of FIG. 4. The keywords retrieved by lookup are then composed to form redirect URL 504 inclusive of the replacement keywords.

Figure 6:
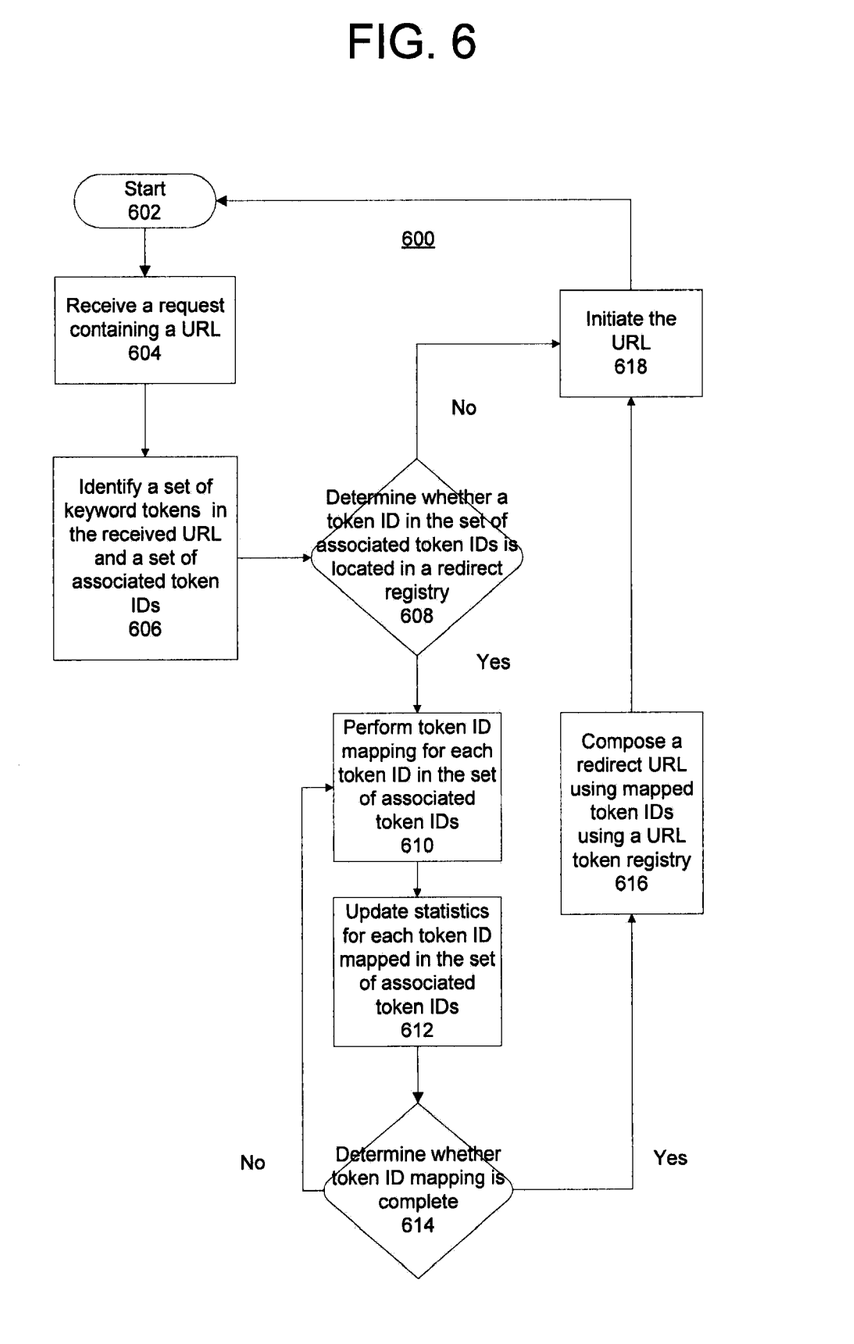
FIG. 6 is a flowchart of process for redirect management process representative of the logical view of FIG. 5 in accordance with an illustrative embodiment of the disclosure.

With reference to FIG. 6 a flowchart of process for redirect management process representative of the logical view of FIG. 5 in accordance with an illustrative embodiment of the disclosure is presented. Process 600 is an example of a process using redirect engine 300 of FIG. 3 to transform a URL containing inactive portions into a redirect URL containing portions as a replacement for the input URL containing inactive portions.

Process 600 starts (block 602) and receives a request containing a URL (block 604). The URL of the request, for example, is directed toward a product representative of http://www.sampleurl.com/en/Furniture/LoungeChairs/EliteLoungeChair. However, in this example the initial URL is changed to direct a user toward http://www.sampleurl.com/en/Furniture/LoungeChairs/PremiumLoungeChair. Using an embodiment of the disclosed process enables site visitors to use the original URL address that may be book marked, or that search engines may have indexed. Embodiments of process 600 provide a capability to programmatically remap the old URL address to the new URL address thereby preserving the rank of the web page in search engines. When a business user changes the EliteLoungeChair keyword of the example to PremiumLoungeChair, process 600 creates a redirect mapping rule between the old URL keyword EliteLoungeChair and the new URL keyword PremiumLoungeChair.

Process 600 identifies a set of keyword tokens in the received URL and a set of associated token IDs (for example, using URL token registry 402 as shown in FIG. 5) (block 606). When the input URL http://www.sampleurl.com/en/Furniture/LoungeChairs/EliteLoungeChair is requested by a site visitor, process 600 determines whether a token ID in the set of associated token IDs is located in a redirect registry (block 608). Process 600 performs a lookup in the redirect registry for a redirect rule associated with any of the token IDs input. Responsive to a determination that a token ID in the set of associated token IDs is not located in a redirect registry, process 600 initiates the URL (block 618). Process 600 loops back to block 602 to await a request as before.

Responsive to a determination that a token ID in the set of associated token IDs is located in a redirect registry, process 600 performs token ID mapping for each token ID in the set of associated token IDs (block 610). Token ID mapping replaces the old URL token IDs from the URL address of the request with appropriate redirected URL token IDs to carry out the request. Process 600 updates statistics for each token ID in the set of associated token IDs (block 612). Statistics are updated continually to provide information to aid in maintaining relevancy and efficiency of the redirect registry. Statistics include "last used" (timestamp driven) and "use count" (number of references) used to preen the registry as well as for cache management.

Process 600 determines whether token ID mapping is complete (block 614). In a more complex example multiple URL keywords are changed in the received URL. For the remaining products under a modified category, process 600 does not need to create redirect mappings because the mapping is automatically handled at a parent category URL keyword level.

Assume in the previous example, that the business user also changed the URL keyword for the furniture category from "Furniture" to "HomeFurnishing". Process 600 creates a redirect mapping between the old URL keyword token Furniture and the new URL keyword token of "HomeFurnishing". A bookmarked or search engine indexed URL of http://www.sampleurl.com/en/Furniture/LoungeChairs/EliteLoungeChair is still used and process 600 resolves the new URL address as http://www.sampleurl.com/en/HomeFurnishing/LoungeChairs/PremiumLoungeChair. In the example the category URL redirect mapping and the product URL redirect mapping are performed by process 600 when a site visitor navigates to one of the original product URLs. In this way site visitors continue to navigate to the original URLs indexed by search engines but are forwarded to the new URLs programmatically.

When a determination is made that token ID mapping is not complete process 600 loops back to block 610 to repeat mapping until no input token IDs have an associated redirect token ID. When a determination is made that token ID mapping is complete, process 600 finds a URL keyword token name corresponding to each token ID and replaces all the original input keyword tokens with the redirect tokens in the URL to compose a redirect URL (using mapped token IDs) using a URL token registry (block 616). Process 600 performs a "301 redirect" request against the web server using the new redirected URL to initiate the URL (block 618) and loops back to perform block 602 as before.

In another example of an end-to-end solution using an embodiment of the disclosed process, a shopper invokes a web-based search engine to search for a particular item of interest in the form of a "red espresso machine." The shopper is responded with a number of search results, one of which is for an espresso machine at a specific store. The link provided in the search result for the espresso machine is as follows:
    http://www.sampleurl.com/Kitchenware/Appliances/CoffeeMakers/espresso-red-SKU9019.

The shopper selects the link for the red espresso machine at the store from search results. The shopper does not realize a search engine optimization specialist for the store has changed the URL for this red espresso machine, even though search engine is still showing the original URL (because the search engine has not re-indexed the page). As a result, the red espresso machine is now located at the following URL:
    http://www.sampleurl.com/KitchenwareSales/Appliances/EspressoMachines/Red Espress Machine.

Using an embodiment of the disclosed process when the shopper selects the link for the red espresso machine, the original URL is taken into the system as:
    http://www.sampleurl.com/Kitchenware/Appliances/CoffeeMakers/espresso-red-SKU9019
and processed. The pattern of the URL provided is identified and recorded. This pattern is then used to decompose the URL into respective most basic parts, keyword portions, of the URL including Kitchenware, Appliances, CoffeeMakers and espresso-red-SKU9019. A search is performed within the system of the embodiment to find replacement URL keywords for the previously identified portions to yield pairings of Kitchenware->KitchenwareSales, Appliances->no replacement, CoffeeMakers->EspressoMachines and espresso-red-SKU9019->espresso-red->RedEspressoMachine.

As shown, embodiments of the disclosed process find a single replacement keyword, no replacement at all, or a chain of replacements where multiple changes have been made to the same URL keyword. Existing approaches are typically more difficult to manage a growing set of redirect rules including multiple changes to a single URL, particularly when there are multiple changes to a single URL keyword within the URL as in the example. Chains of keyword-to-keyword redirects can be processed intelligently by looking up chain ends programmatically rather then processing each redirect in the chain separately.

The new URL is recomposed by replacing the original URL keywords with corresponding final replacements based on the URL pattern identified to provide a redirect URL of http://www.sampleurl.com/KitchenwareSales/Appliances/EspressoMachines/RedEspressoMachine. The new URL is now available to the runtime in order to perform a "301 redirect." Using an embodiment of the disclosed process enables a shopper to be redirected to a correct URL for the red espresso machine without storing any mapping between the original URL and the redirected URL.

Figure 7:
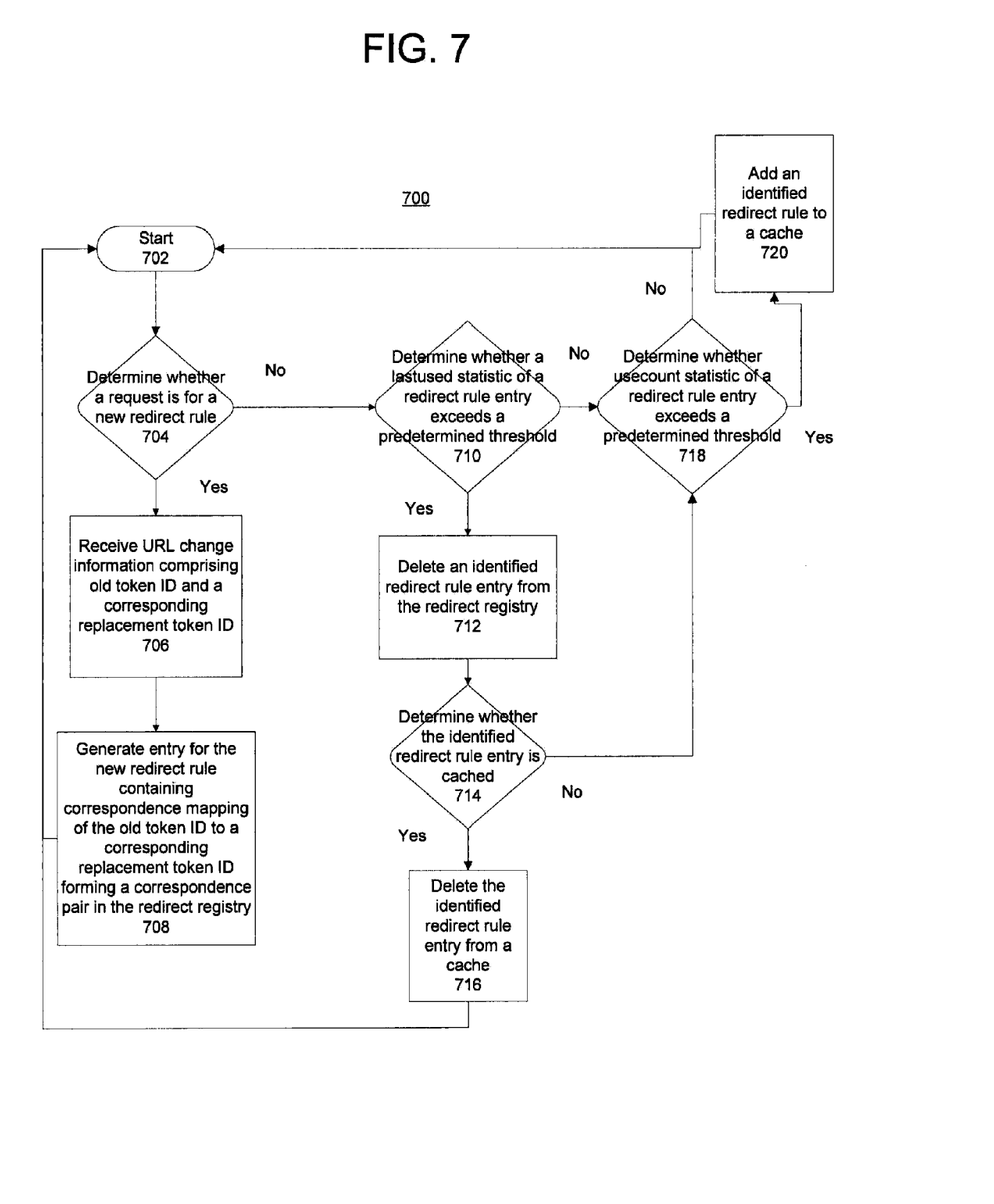
FIG. 7 is a flowchart of process for managing the redirect registry portion of the redirect engine of FIG. 3 in accordance with an illustrative embodiment of the disclosure.

With reference to FIG. 7 a flowchart of a process for managing the redirect registry portion of the redirect engine of FIG. 3 is generally shown in accordance with an illustrative embodiment of the disclosure. Process 700 is an example of a process used to add and remove entries in redirect registry 300 of FIG. 3. Process 700 is also used as a cache management process for cached entries redirect registry 300 of FIG. 3.

Process 700 starts (block 702) and determines whether a request is for a new redirect rule (block 704). Responsive to a determination the request is for a new redirect rule process 700 receives URL change information including an old token ID and a corresponding replacement token ID (block 706). The change information is made available by a change process external to process 700 (outside the scope of the current disclosure). For example, a business user, using a suitable tool, may input an original URL and provide an update in the form of a changed keyword. The unique IDs of the old keyword and the new keyword are made available by the tool to a process such as process 700.

Process 700 generates an entry for the new redirect rule containing a correspondence mapping of the old token ID to a replacement token ID forming a correspondence pair in the redirect registry (block 708). The correspondence pair is representative of the change made between the old keyword and the new keyword. Process 700 loops back to block 702 awaiting a request. Using process 700 requires no system down time when new redirect mappings are created (no server restarts are required).

Responsive to a determination the request is not for a new redirect rule process 700 determines whether a "last used" statistic of a redirect rule entry exceeds a predetermined threshold (block 710). For example, when a "last used" date of an entry exceeds a predetermined time (for example a timestamp) value.

Responsive to a determination the "last used" statistic of a redirect rule entry exceeds a predetermined threshold process 700 and deletes an identified rule entry from the redirect registry (block 712). The identified rule entry is an entry containing a correspondence pair in which a "last used" statistic of one or both entries exceeds a predetermined threshold. Process 700 determines whether the identified rule entry is cached (block 714). Responsive to a determination the identified rule entry is cached, process 700 deletes the identified rule entry from a cache (block 716) and loops back to block 702 as before. Responsive to a determination that the identified rule entry is not cached process 700 loops back to perform block 718. Caching of a redirect registry or entries is a performance consideration. The redirect rules are added to a data cache to reduce a need to perform a database lookup the next time the same redirect rules are used. When a redirect rule is not used in a configurable amount of time then it is deleted from the cache and the database, thereby reducing the database footprint automatically. Caching the mapping between the original URLs and redirected URLs avoids using the token identification process again.

Responsive to a determination that the "last used" statistic of a redirect rule entry does not exceed a predetermined threshold, process 700 determines whether a "use count" statistic of a redirect rule entry exceeds a predetermined threshold (block 718). Responsive to a determination the "use count" statistic of a redirect rule entry exceeds a predetermined threshold, process 700 adds the identified rule to the cache (block 720) and loops back to perform block 702 as before. Responsive to a determination the "use count" statistic of a redirect rule entry does not exceed a predetermined threshold, process 700 loops back to perform block 702 as before.

Using an embodiment of the disclosed process, URL mappings are not stored; rather URL mappings are computed on the fly in a runtime. Changes between URL keywords, the smallest elements of a URL, are saved in a data structure of the redirect registry for future use. Using the previous example, only a single change between "Furniture" and "SpringFurniture" is saved rather than a map including a complete set of URL definitions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

What is claimed is:

1. A computer-implemented process for programmatic redirect management, the computer-implemented process comprising:

receiving a request containing a uniform resource locator;

identifying a set of keyword tokens in the uniform resource locator of the request and a set of associated token identifications;

determining whether a token identification in the set of associated token identifications is located in a data structure of a redirect registry;

responsive to a determination that the token identification in the set of associated token identifications is located in the redirect registry, performing token identification mapping for each token identification in the set of associated token identifications;

updating statistics for each token identification mapped in the set of associated token identifications;

determining whether token identification mapping is complete;

responsive to a determination that token identification mapping is complete, composing a redirect uniform resource locator;

determining whether a last used statistic of a redirect rule entry exceeds a predetermined threshold; and responsive to a determination that the last used statistic of a redirect rule entry exceeds a predetermined threshold, deleting an identified redirect rule entry from the redirect registry.

2. The computer-implemented process of claim 1 wherein identifying a set of keyword tokens in the received uniform resource locator and a set of associated token identifications further comprises:
   determining whether the request is for a new redirect rule;
   responsive to a determination that the request is for a new redirect rule, receiving uniform resource locator change information comprising an old token identification and a corresponding replacement token identification; and
   generating an entry for the new redirect rule, wherein the new redirect rule contains a correspondence mapping of the old token identification to a corresponding replacement token identification forming a correspondence pair in the redirect registry.

3. The computer-implemented process of claim 1 wherein performing token identification mapping for each token identification in the set of associated token identifications further comprises:
   replacing each token identification in the set of associated token identifications from the uniform resource locator of the request with an appropriate redirected uniform resource locator token identification.

4. The computer-implemented process of claim 1 updating statistics for each token identification mapped in the set of associated token identifications further comprises:
   determining whether a use count statistic of a redirect rule entry exceeds a predetermined threshold; and
   responsive to a determination that the use count statistic of a redirect rule entry exceeds a predetermined threshold, adding an identified rule to a cache.

5. The computer-implemented process of claim 1 wherein composing a redirect uniform resource locator further comprises:
   iterating through each token identification in the uniform resource locator of the request;
   finding a uniform resource locator keyword token name corresponding to each token identification in a data structure of a uniform resource locator token registry;
   replacing all original input keyword tokens with redirect tokens in the uniform resource locator of the request to compose a redirect uniform resource locator using the uniform resource locator token registry; and
   initiating the redirect uniform resource locator.

6. The computer-implemented process of claim 1 wherein deleting an identified redirect rule entry from the redirect registry further comprises:
   determining whether a redirect rule entry is cached; and
   responsive to a determination that the redirect rule entry is cached, deleting the identified redirect rule entry from a cache.

7. A computer program product for programmatic redirect management, the computer program product comprising:
   a non-transitory computer readable storage medium having computer readable program code embedded therewith, the computer readable program code comprising:
   computer readable program code configured for performing a method comprising:
      receiving a request containing a uniform resource locator;
      identifying a set of keyword tokens in the uniform resource locator of the request and a set of associated token identifications;
      determining whether a token identification in the set of associated token identifications is located in a data structure of a redirect registry;
      responsive to a determination that the token identification in the set of associated token identifications is located in the redirect registry, for performing token identification mapping for each token identification in the set of associated token identifications;
      updating statistics for each token identification mapped in the set of associated token identifications;
      determining whether token identification mapping is complete;
      responsive to a determination that token identification mapping is complete, for composing a redirect uniform resource locator;
      determining whether a last used statistic of a redirect rule entry exceeds a predetermined threshold; and
      responsive to a determination that the last used statistic of a redirect rule entry exceeds a predetermined threshold, for deleting an identified redirect rule entry from the redirect registry.

8. The computer program product of claim 7 wherein computer executable program code for identifying a set of keyword tokens in the received uniform resource locator and a set of associated token identifications further comprises:
   computer executable program code for determining whether the request is for a new redirect rule;
   computer executable program code responsive to a determination that the request is for a new redirect rule, for receiving uniform resource locator change information comprising an old token identification and a corresponding replacement token identification; and
   computer executable program code for generating an entry for the new redirect rule, wherein the new redirect rule contains a correspondence mapping of the old token identification to a corresponding replacement token identification forming a correspondence pair in the redirect registry.

9. The computer program product of claim 7 wherein computer executable program code for performing token identification mapping for each token identification in the set of associated token identifications further comprises:
   computer executable program code for replacing each token identification in the set of associated token identifications from the uniform resource locator of the request with an appropriate redirected uniform resource locator token identification.

10. The computer program product of claim 7 wherein computer executable program code for updating statistics for each token identification mapped in the set of associated token identifications further comprises:
   computer executable program code for determining whether a use count statistic of a redirect rule entry exceeds a predetermined threshold; and
   computer executable program code responsive to a determination that the use count statistic of a redirect rule entry exceeds a predetermined threshold, for adding an identified rule to a cache.

11. The computer program product of claim 7 wherein computer executable program code for composing a redirect uniform resource locator further comprises:
   computer executable program code for iterating through each token identification in the uniform resource locator of the request;
   computer executable program code for finding a uniform resource locator keyword token name corresponding to each token identification in a data structure of a uniform resource locator token registry;

computer executable program code for replacing all original input keyword tokens with redirect tokens in the uniform resource locator of the request to compose a redirect uniform resource locator using the uniform resource locator token registry; and computer executable program code for initiating the redirect uniform resource locator.

12. The computer program product of claim 7 wherein computer executable program code for deleting an identified redirect rule entry from the redirect registry further comprises:

computer executable program code for determining whether a redirect rule entry is cached; and computer executable program code responsive to a determination that the redirect rule entry is cached, for deleting the identified redirect rule entry from a cache.

13. A system for programmatic redirect management, the system comprising:

a processor unit configured to perform a method comprising:

receiving a request containing a uniform resource locator;

identifying a set of keyword tokens in the uniform resource locator of the request and a set of associated token identifications;

determining whether a token identification in the set of associated token identifications is located in a data structure of a redirect registry;

responsive to a determination that the token identification in the set of associated token identifications is located in the redirect registry, performing token identification mapping for each token identification in the set of associated token identifications;

updating statistics for each token identification mapped in the set of associated token identifications;

determining whether token identification mapping is complete;

responsive to a determination that token identification mapping is complete, composing a redirect uniform resource locator;

determining whether a last used statistic of a redirect rule entry exceeds a predetermined threshold; and responsive to a determination that the last used statistic of a redirect rule entry exceeds a predetermined threshold, deleting an identified redirect rule entry from the redirect registry.

14. The system of claim 13 wherein the method further comprises:

determining whether the request is for a new redirect rule;

responsive to a determination that the request is for a new redirect rule, receiving uniform resource locator change information comprising an old token identification and a corresponding replacement token identification; and generating an entry for the new redirect rule, wherein the new redirect rule contains a correspondence mapping of the old token identification to a corresponding replacement token identification forming a correspondence pair in the redirect registry.

15. The system of claim 13 wherein the method further comprises replacing each token identification in the set of associated token identifications from the uniform resource locator of the request with an appropriate redirected uniform resource locator token identification.

16. The system of claim 13 wherein the method further comprises:

determining whether a use count statistic of a redirect rule entry exceeds a predetermined threshold; and responsive to a determination that the use count statistic of a redirect rule entry exceeds a predetermined threshold, adding an identified rule to a cache.

17. The system of claim 13 wherein the method further comprises:

iterating through each token identification in the uniform resource locator of the request;

finding a uniform resource locator keyword token name corresponding to each token identification in a data structure of a uniform resource locator token registry;

replacing all original input keyword tokens with redirect tokens in the uniform resource locator of the request to compose a redirect uniform resource locator using the uniform resource locator token registry; and initiating the redirect uniform resource locator.

* * * * *